United States Patent
Hehs et al.

(10) Patent No.: US 11,199,113 B2
(45) Date of Patent: Dec. 14, 2021

(54) COMBINED CYCLE POWER PLANT AND METHOD FOR OPERATING THE COMBINED CYCLE POWER PLANT

(71) Applicant: General Electric Company, Schenectady, NY (US)

(72) Inventors: Herbert Hehs, Baden (CH); Mirco Giacomo Colombo, Baden (CH)

(73) Assignee: General Electric Company, Schenectady, NY (US)

(*) Notice: Subject to any disclaimer, the term of this patent is extended or adjusted under 35 U.S.C. 154(b) by 198 days.

(21) Appl. No.: 16/228,865

(22) Filed: Dec. 21, 2018

(65) Prior Publication Data

US 2020/0200051 A1   Jun. 25, 2020

(51) Int. Cl.
 *F01K 23/10* (2006.01)
 *F22B 1/18* (2006.01)
 *F01K 7/32* (2006.01)

(52) U.S. Cl.
 CPC .............. *F01K 23/106* (2013.01); *F01K 7/32* (2013.01); *F01K 23/10* (2013.01); *F22B 1/1815* (2013.01); *F05D 2220/32* (2013.01); *F05D 2220/72* (2013.01)

(58) Field of Classification Search
 CPC .......... F01K 23/106; F01K 23/10; F01K 7/32; F22B 1/1815; F05D 2220/72; F05D 2220/32; Y02E 20/16; F02C 6/18
 USPC ...................... 60/39.182, 653, 654, 677–680
 See application file for complete search history.

(56) References Cited

U.S. PATENT DOCUMENTS

| | | | | |
|---|---|---|---|---|
| 3,950,137 A | * | 4/1976 | Larson ................. | G01N 27/021 422/81 |
| 5,237,816 A | * | 8/1993 | Duffy ................... | F01K 23/108 60/39.182 |
| 5,840,130 A | | 11/1998 | Liebig et al. | |
| 6,237,321 B1 | | 5/2001 | Schmid et al. | |
| 10,006,313 B2 | * | 6/2018 | Drouvot ............... | F01K 17/025 |
| 2004/0025510 A1 | | 2/2004 | Schwarzott | |
| 2004/0104017 A1 | * | 6/2004 | Franke .................... | F02C 7/185 165/157 |
| 2014/0165572 A1 | * | 6/2014 | Pang ....................... | F02C 7/224 60/736 |
| 2014/0208752 A1 | * | 7/2014 | Palanisamy ............ | F01K 3/004 60/648 |
| 2016/0273405 A1 | * | 9/2016 | Gasparini ................ | F02C 6/18 |
| 2019/0319702 A1 | | 10/2019 | Gazzola et al. | |

* cited by examiner

*Primary Examiner* — Hoang M Nguyen
(74) *Attorney, Agent, or Firm* — Dority & Manning, P.A.

(57) ABSTRACT

A combined cycle power plant includes a gas turbine, a steam turbine and a heat recovery steam generator. The heat recovery steam generator is arranged to receive exhaust gas from the gas turbine for reheating condensate from the steam turbine and generating steam for the steam turbine. And the heat recovery steam generator includes at least one drum evaporator configured to receive a first part of the condensate; a pump configured to receive a second part of the condensate and increase the second part of the condensate to an elevated pressure; and a high-pressure assembly configured to receive the condensate from the pump and operate the condensate from the pump at a subcritical up to a supercritical pressure range.

18 Claims, 2 Drawing Sheets

Figure 1:
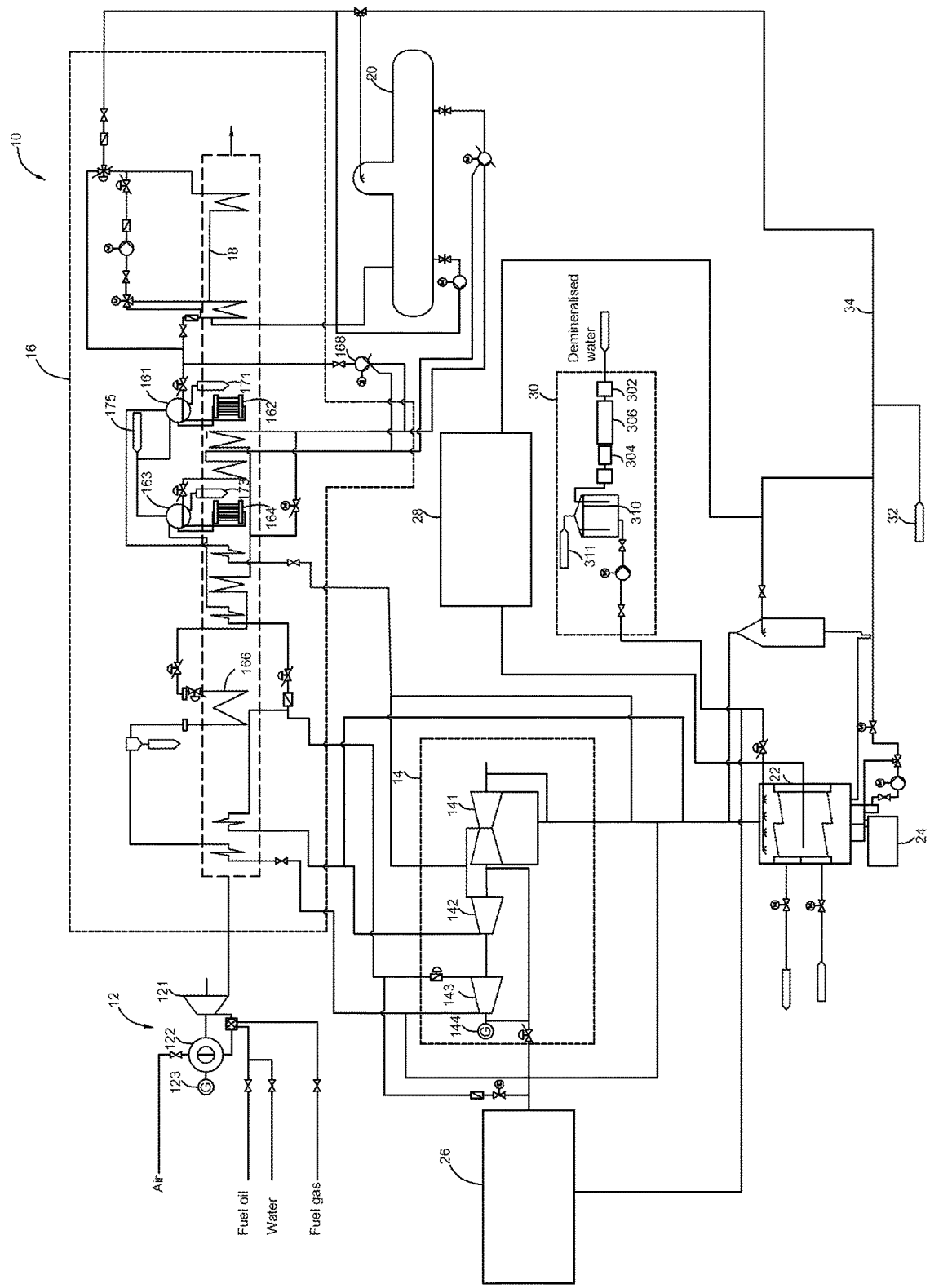

COMBINED CYCLE POWER PLANT AND METHOD FOR OPERATING THE COMBINED CYCLE POWER PLANT

BACKGROUND

Embodiments of the disclosure relate generally to a combined cycle power plant, and more particularly relate to a combined cycle power plant having at least one high temperature and pressure stage.

In combined cycle power plants, a common combination includes an assembly of a gas turbine (GT), a steam turbine (ST) and a heat recovery steam generator (HRSG). Exhaust heat of the gas turbine is used to generate steam by passing it through the heat recovery steam generator, and the produced steam can be used to drive the steam turbine. HRSGs typically include one or more, for example two or three, pressure stages, and each pressure stage conventionally has a preheater (economizer) and an evaporator.

In the combined cycle power plant, impurities, for example solid state, liquid state or gaseous state contaminants, may be introduced through leakages, vents, polluted make-up water, impure dosing chemicals or left-overs from construction. Most of the impurities, especially the corrosive salts, have a lower volatility than water. Thus, they accumulate rather in water than in a steam phase. This fact is used in drum type HRSGs where a small fraction of the impurities containing water is continuously or intermittent purged out of the drum, carrying with the impurities that have accumulated in the water. However, this cleaning process is only effective at moderate pressures and temperatures, at high temperature and pressure, the impurities evaporate as well or are mechanically carried over into the steam, increasing the risk of corrosion or deposit formation for the plant.

For this reason, the feed water needs a high purity. Traditionally, a condensate polisher is installed in the combined cycle power plant in order to remove the impurities from the cycle. However, highly skilled personnel are required to operate the condensate polisher, and thus the installation and operation of the condensate polisher is demanding and costly.

Therefore, it is desirable to provide a new approach to operate the combined cycle power plant to address at least one of the above-mentioned situations.

BRIEF DESCRIPTION

In accordance with one embodiment disclosed herein, a combined cycle power plant includes a gas turbine, a steam turbine and a heat recovery steam generator. The heat recovery steam generator is arranged to receive exhaust gas from the gas turbine for reheating condensate from the steam turbine and generating steam for the steam turbine. And the heat recovery steam generator includes at least one drum evaporator configured to receive a first part of the condensate; a pump configured to receive a second part of the condensate and increase the second part of the condensate to an elevated pressure; and a high-pressure assembly configured to receive at least part of the condensate from the pump and operate the condensate at a subcritical up to a supercritical pressure range.

In accordance with another embodiment disclosed herein, a method for operating a combined cycle power plant includes: directing exhaust gas from a gas turbine to a heat recovery steam generator; reheating condensate from a steam turbine in the heat recovery steam generator; and generating steam in the heat recovery steam generator for the steam turbine. Wherein reheating the condensate includes: directing a first part of the condensate to at least one drum evaporator and a second part of the condensate to a pump; increasing the second part of the condensate to an elevated pressure via the pump; and receiving at least part of the condensate from the pump via a high-pressure assembly and operating the condensate at a subcritical pressure.

DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

Figure 2:
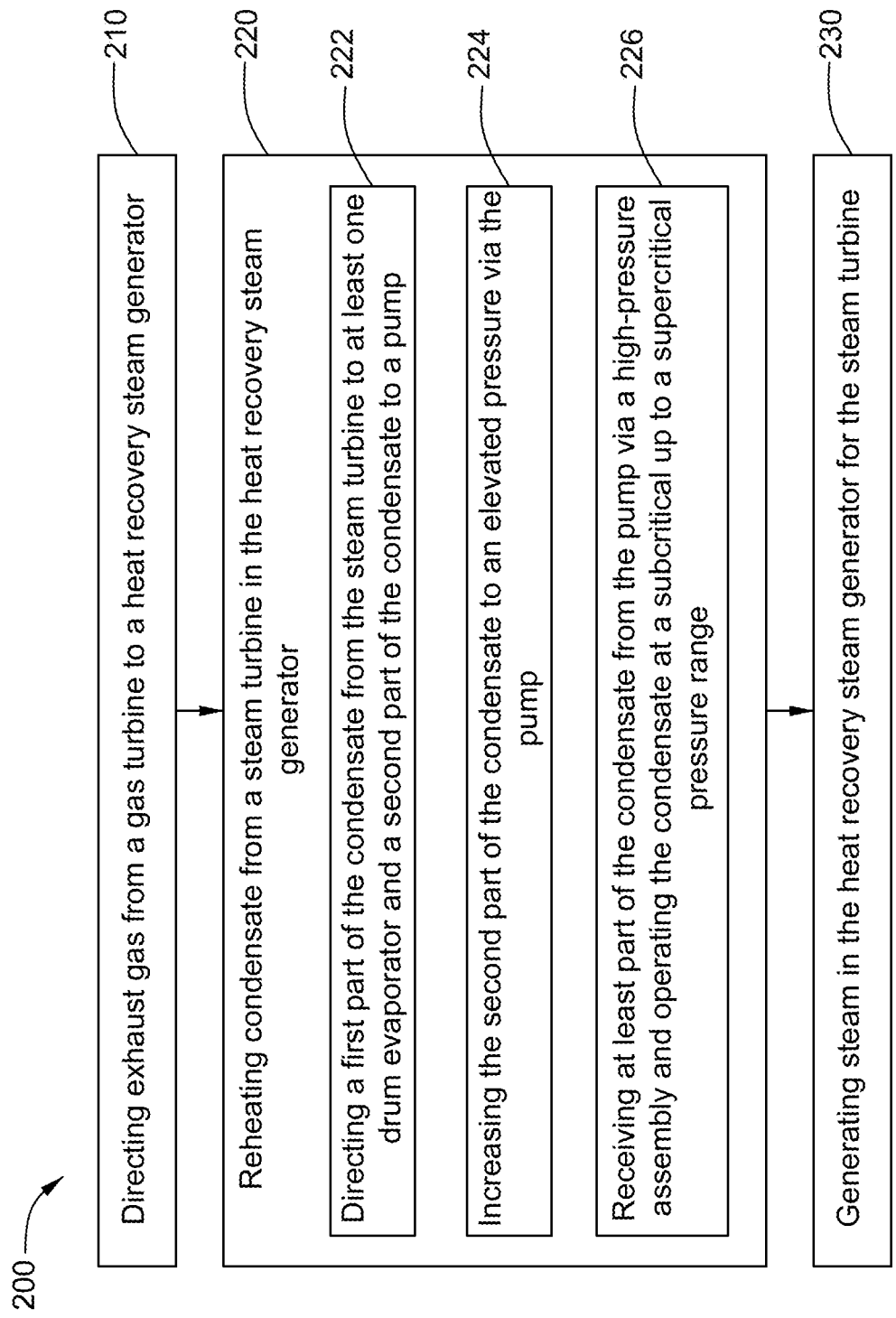

FIG. 1 is a schematic drawing of a combined cycle power plant (CCPP) in accordance with some embodiments of the present disclosure; and FIG. 2 is a flow chart of a method for operating a CCPP in accordance with some embodiments of the present disclosure.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "component", "module", "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer.

FIG. 1 is a schematic drawing of a combined cycle power plant (CCPP) 10. The combined cycle power plant 10 includes a gas turbine 12, a steam turbine 14 and a heat recovery steam generator 16. The gas turbine 12 includes a combustion turbine 121 and a compressor 122 and is configured to drive a first generator 123. Heat from the gas turbine's exhaust gas is used to generate steam by passing it through the heat recovery steam generator 16, and the steam at high pressure and high temperature is then used in the steam turbine 14. The steam turbine 14 includes three separate turbine modules operated at different pressure and/or temperature levels. These turbine modules include a low-pressure (LP) turbine module 141, an intermediate pressure (IP) turbine module 142 coupled to the low-pressure turbine module 141, and a high-pressure (HP) turbine module 143 coupled to the intermediate pressure turbine module 142. The high-pressure turbine module 143 is coupled to a second generator 144 which produces electric power.

The heat recovery steam generator 16 is arranged to receive exhaust gas from the gas turbine 12 for reheating condensate from the steam turbine 14 and generating the steam for the steam turbine 14. In some embodiments, the condensate may also come from a feed water storage 20 coupled to the heat recovery steam generator 16. The heat recovery steam generator 16 is a multi-pressure heat recovery steam generator (HRSG), which includes at least one drum evaporator and a high-pressure (HP) assembly 166. In an embodiment, as shown in FIG. 1, the heat recovery steam generator 16 includes a low-pressure (LP) drum evaporator 162 with a low-pressure drum 161 and an intermediate pressure (IP) drum evaporator 164 with an intermediate pressure drum 163. In some embodiments, the high-pressure assembly 166 includes a high-pressure steam generator, and the high-pressure steam generator may be a once-through type evaporator or a high-pressure drum evaporator.

The low-pressure drum 161 of the low-pressure drum evaporator 162 is configured to receive a first part of the condensate, and a second part of the condensate may be fed into a pump 168. In some embodiments, the pump 168 is a pressure increasing pump (also referred to as a boost pump). The pump 168 is configured to increase the pressure of the second part of the condensate to an elevated pressure, and the high-pressure assembly 166 is configured to receive at least part of the condensate from the pump 168 and operate the at least part of the condensate at a subcritical up to supercritical pressure range. The other part of the condensate from the pump 168 is received by the intermediate pressure drum 163. In some embodiments, the once-through type evaporator or the high-pressure drum evaporator is configured to operate the condensate from the pump 168 at a pressure equal to or higher than about 160 bars.

It is in at least one of the low-pressure drum evaporator 162, the intermediate pressure drum evaporator 164 and the high-pressure assembly 166 where a boiling process or steam generation occurs. As heat energy from the exhaust gas is absorbed by the condensate or feed water, some of the condensate or feed water evaporates or vaporizes to steam. Normally, a condensate polisher is used in the combined cycle power plant 10 to minimize impurities in the condensate or feed water and decrease risks of corrosion or deposit formation for the plant 10 at high temperatures and high pressures. In the absence of the costly condensate polisher, at least one optimized impurity ingress control measure is used to minimize impurities in the condensate or feed water.

In some embodiments, in the combined cycle power plant 10, at least one of the low-pressure drum and the intermediate pressure drum comprises a blowdown to remove the impurities from the at least one of the low-pressure drum and the intermediate pressure drum. As shown in FIG. 1, the low-pressure drum 161 includes a blowdown 171, and the intermediate pressure drum 163 includes a blowdown 173. The impurities are concentrated in the low-pressure drum 161 and the intermediate pressure drum 163, and removed from them with the blowdowns 171, 173, respectively. In some embodiments, a chemical reagent dosing module 175 is connected to the at least one of the low-pressure drum 161 and the intermediate pressure drum 163 is configured to be added a chemical reagent to the at least one of the low-pressure drum 161 and the intermediate pressure drum 163. The chemical reagent may be used to adjust a pH range and retain impurities in water phase of the at least one of the low-pressure drum 161 and the intermediate pressure drum 163, which may accelerate the impurities removal process of the blowdowns 171, 173. The pump 168 allows for solid alkalization and high concentration factors in the low-pressure drum evaporator 162 and intermediate pressure drum evaporator 164. In some embodiments, the chemical reagent includes at least one of alkali phosphate or alkali hydroxide. The chemical reagent may be used to adjust the pH range in the water phase of the condensate in the low-pressure drum 161 and the intermediate pressure drum 163 from about 8.5 to about 10.

Conventionally, the chemical reagent of technical purity grade may have an impurity level that does not conform to chemical needs for the present disclosure, which will bring new impurities to the plant 10. In some embodiments, high purity chemical reagents of analytical grade may be used, and a purity of the chemical reagent is higher than about 99%. In some specific embodiments, the purity of the chemical reagent is from about 99.5% to about 99.9%.

In some embodiments, the heat recovery steam generator 16 further includes a preheater (an economizer) 18 for receiving and heating the condensate from the steam turbine 14 directly or from the feed water storage 20 before entering the low-pressure drum evaporator 162 or the pump 168. The condensate passes through the low-pressure drum 161, the intermediate pressure drum 163 and high-pressure assembly 166, and generates steam for the steam turbine 14. The steam generated by the low-pressure drum 161, the intermediate pressure drum 163 and high-pressure assembly 166 is provided to the low-pressure turbine module 141, the intermediate pressure turbine module 142 and a high-pressure turbine module 143, respectively.

In some embodiments, the combined cycle power plant 10 further includes a leak tight condenser 22 coupled to the steam turbine 14. The leak tight condenser 22 receives the condensate from the steam turbine 14 and conveys the condensate to the heat recovery steam generator 16 or the feed water storage tank 20. Water leakages into a condenser are mostly caused by mechanical tube failures or small leakages at connections of the tube to tube sheet. Mechanical tube failures are normally rapidly detected and repaired, small leakages at the tube to tube sheet connection might be unnoticed for a long time. However, the leak tight condenser 22 is proven very low water leakage rate and prevent bringing the impurities into the cycle.

Date collected on the plants evaluated shows that there is always a small air in-leakage in the condenser and related connection, which will bring air impurities, such as oxygen and carbon dioxide, into the cycle. In some embodiments, as shown in FIG. 1, a vacuum pump 28 is coupled to the leak tight condenser 22 and configured to keep the leak tight condenser 22 evacuated during standstill. The vacuum keeping capability enables better control of impurities ingress during standstill. In some embodiments, in order to make the steam reached a required steam purity for the steam turbine 14 without any unnecessary waiting time, an auxiliary boiler 26 coupled to the steam turbine 14 is cooperated with the vacuum pump 28 for gland steam and enabling the evacuation of the cycle prior to start-up.

As noted above, the traditional condensate polisher for removing the impurities from the cycle is usually demanding and costly. For promoting the efficiency of impurities removal, in some embodiments a small-scale condensate polisher 24 is provided and coupled to the leak tight condenser to remove the impurities with a relative small cost.

Some embodiments of this present disclosure provide one optimized impurity ingress control measure that includes adding a volatile chemical reagent to the condensate or feed water before entering the heat recovery steam generator 16. The volatile chemical reagent is stored in a volatile chemical reagent dosing module 32 and added in a pipe line 34 between the leak tight condenser 22 and at least one of the feed water storage 20 and the preheater 18. In some embodiments, the volatile chemical reagent includes ammonia, and a purity of the volatile chemical reagent is also higher than about 99%. In some specific embodiments, the purity of the volatile chemical reagent is from about 99.5% to about 99.9%.

In addition, some embodiments disclose another optimized impurity ingress control measure. For example, in some embodiments, a post treatment system 30 is configured to treat demineralised water from a water treatment plant as make-up water. The make-up water is fed to at least one of the leak tight condenser 22, the feed water storage 20 and the heat recovery steam generator 16. The post treatment system 30 includes at least one a storage tank 310 with a nitrogen blanket 311, a UV unit 302, a mixed bed ion exchange unit 304 and a membrane deaeration unit 306. In some embodiments, the nitrogen blanket 311 may be replaced by a CO2 trap.

The present disclosure also describes a method for operating a combined cycle power plant. Referring to FIGS. 1 and 2, the method 200 includes the following steps.

Step 210, directing exhaust gas from the gas turbine 12 to the heat recovery steam generator 16.

Step 220, reheating condensate from the steam turbine 14 in the heat recovery steam generator 16.

Step 230, generating steam in the heat recovery steam generator 16 for the steam turbine 14.

In some embodiments, the step 220 further includes step 222, step 224 and step 226.

Step 222, directing the first part of the condensate from the steam turbine 14 to the low-pressure drum evaporator 162 and a second part of the condensate to the pump 168.

Step 224, increasing the second part of the condensate to the elevated pressure via the pump 168.

Step 226, receiving at least part of the condensate from the pump 168 via the high-pressure assembly 166 and operating the condensate at a subcritical up to a supercritical pressure range.

In some embodiments, step 220 further includes removing impurities from the condensate in the low-pressure drum 161 and the intermediate pressure drum 163 via the blowdowns 171, 173 or via adding the chemical reagent to the low-pressure drum 161 and the intermediate pressure drum 163, respectively. In some embodiments, the chemical reagent includes at least one of alkali phosphate or alkali hydroxide, and the purity of the chemical reagent is higher than about 99%.

In some embodiments, the method 200 further includes adding the volatile chemical reagent to the condensate before entering the heat recovery steam generator 16. In some embodiments, the chemical reagent includes ammonia, and the purity of the chemical reagent is higher than about 99%.

It should be noted that the combined cycle power plant and the method of the present disclosure is to limit the impurities in the cycle by reducing and controlling the ingress of impurities, especially for the heat recovery steam generator at a very high operation pressure, for example a subcritical up to a supercritical pressure range, in the absence of the conventional condensate polisher While embodiments of the disclosure have been described herein, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A combined cycle power plant, comprising:
   a gas turbine;
   a steam turbine;
   a heat recovery steam generator arranged to receive exhaust gas from the gas turbine for reheating condensate from the steam turbine and generating steam for the steam turbine; and
   a volatile chemical reagent dosing module configured to add a volatile chemical reagent to the condensate before entering the heat recovery steam generator, wherein the heat recovery steam generator comprises:
   at least one drum evaporator configured to receive a first part of the condensate;
   a pump configured to receive a second part of the condensate and increase the second part of the condensate to an elevated pressure; and
   a high-pressure assembly configured to receive at least part of the condensate from the pump and operate the condensate at a subcritical up to a supercritical pressure range.

2. The combined cycle power plant of claim 1, wherein the high-pressure assembly comprises a high-pressure steam generator, and the high-pressure steam generator comprises a once-through type evaporator or a high-pressure drum evaporator and operates at a pressure equal to or higher than about 160 bars.

3. The combined cycle power plant of claim 1, further comprising a feed water storage coupled to the heat recovery steam generator, wherein the heat recovery steam generator further comprises a preheater for receiving and heating the condensate from the steam turbine directly or from the feed water storage.

4. The combined cycle power plant of claim 1, wherein the heat recovery steam generator comprises a low-pressure drum evaporator with a low-pressure drum and an intermediate pressure drum evaporator with an intermediate pressure drum.

5. The combined cycle power plant of claim 4, wherein the low-pressure drum and the pump receive the condensate, and the intermediate drum receives the other part of the condensate from the pump.

6. The combined cycle power plant of claim 4, wherein at least one of the low-pressure drum and the intermediate pressure drum comprises a blowdown configured to remove the impurities from the at least one of the low-pressure drum and the intermediate pressure drum.

7. The combined cycle power plant of claim 6, further comprising a chemical reagent dosing module configured to add a chemical reagent to the at least one of the low-pressure drum and the intermediate pressure drum, wherein the chemical reagent is configured to adjust pH range and retain impurities in water phase of the at least one of the low-pressure drum and the intermediate pressure drum.

8. The combined cycle power plant of claim 7, wherein the pH range in water phase in at least one of the low-pressure drum and the intermediate pressure drum is from about 8.5 to about 10.

9. The combined cycle power plant of claim 7, wherein a purity of the chemical reagent is higher than 99%, the chemical reagent comprises at least one of alkali phosphate or alkali hydroxide.

10. The combined cycle power plant of claim 1, wherein a purity of the volatile chemical reagent is higher than 99%, and the volatile chemical reagent comprises ammonia.

11. The combined cycle power plant of claim 1, further comprising a leak tight condenser coupled between the steam turbine and the heat recovery steam generator.

12. The combined cycle power plant of claim 11, further comprising a vacuum pump coupled to the leak tight condenser and configured to keep the leak tight condenser evacuated during standstill.

13. The combined cycle power plant of claim 12, further comprising a condensate polisher coupled to the leak tight condenser.

14. The combined cycle power plant of claim 1, further comprising an auxiliary boiler coupled to the steam turbine for gland steam.

15. The combined cycle power plant of claim 1, further comprising a post treatment system configured to treat demineralised water as make-up water, wherein the post treatment system comprises at least one of a storage tank a nitrogen blanket, a UV unit, a mixed bed ion exchange unit, and a membrane deaeration unit.

16. A method for operating a combined cycle power plant, comprising:
   directing exhaust gas from a gas turbine to a heat recovery steam generator;
   reheating condensate from a steam turbine in the heat recovery steam generator;
   adding a volatile chemical reagent to the condensate before entering the heat recovery steam generator; and
   generating steam in the heat recovery steam generator for the steam turbine, wherein reheating the condensate comprises:
   directing a first part of the condensate from the steam turbine to at least one drum evaporator and a second part of the condensate to a pump;
   increasing the second part of the condensate to an elevated pressure via the pump; and
   receiving at least part of the condensate from the pump via a high-pressure assembly and operating the condensate at a subcritical up to a supercritical pressure range.

17. The method of claim 16, wherein reheating the condensate further comprises removing impurities from the condensate in a drum of the at least one drum evaporator via a blow down of the drum.

18. The method of claim 17, wherein reheating the condensate further comprises adding a chemical reagent to the at least one of a low-pressure drum and an intermediate pressure drum to adjust pH range and retain impurities in water phase of the at least one of the low-pressure drum and the intermediate pressure drum.

* * * * *